United States Patent
Bowman et al.

(10) Patent No.: US 9,181,410 B2
(45) Date of Patent: Nov. 10, 2015

(54) SYSTEMS FOR EFFICIENT HEATING AND/OR COOLING AND HAVING LOW CLIMATE CHANGE IMPACT

(75) Inventors: James M. Bowman, Geneva, IL (US); David J. Williams, East Amherst, NY (US); Samuel F. Yana Motta, East Amherst, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 371 days.

(21) Appl. No.: 13/191,141

(22) Filed: Jul. 26, 2011

(65) Prior Publication Data

US 2012/0012591 A1 Jan. 19, 2012

Related U.S. Application Data

(60) Continuation-in-part of application No. 12/276,137, filed on Nov. 21, 2008, now abandoned, which is a continuation of application No. PCT/US2007/064570, filed on Mar. 21, 2007, and a continuation-in-part of application No. 11/474,887, filed on Jun. 26, 2006, application No. 13/191,141, which is a continuation-in-part of application No. 12/426,948, filed on Apr. 20, 2009, now Pat. No. 8,033,120, which is a division of application No. 10/694,273, filed on Oct. 27, 2003, now Pat. No. 7,534,366.

(60) Provisional application No. 61/368,249, filed on Jul. 27, 2010, provisional application No. 60/989,977, filed on Nov. 25, 2007, provisional application No. 60/784,731, filed on Mar. 21, 2006, provisional application No. 60/421,263, filed on Oct. 25, 2002, provisional application No. 60/421,435, filed on Oct. 25, 2002.

(51) Int. Cl.
*B65D 81/18* (2006.01)
*C08J 9/12* (2006.01)
*C08J 9/14* (2006.01)
*C08K 5/02* (2006.01)

(52) U.S. Cl.
CPC *C08J 9/127* (2013.01); *C08J 9/149* (2013.01); *C08J 2203/06* (2013.01); *C08J 2203/12* (2013.01); *C08J 2203/14* (2013.01); *C08J 2203/142* (2013.01); *C08J 2207/04* (2013.01); *C08K 5/02* (2013.01)

(58) Field of Classification Search
CPC ........ C08J 9/127; C08J 9/149; C08J 2203/06; C08J 2203/12; C08J 2203/14; C08J 2203/142; C08J 2207/04; C08J 9/144; C08J 2203/162; C08J 2205/052; C08J 2375/04; C08K 5/02; B65D 81/18; B65D 81/38
USPC ............ 252/67, 71, 73; 521/98; 570/102.123; 62/3.6
See application file for complete search history.

(56) References Cited

U.S. PATENT DOCUMENTS

| | | | | |
|---|---|---|---|---|
| 3,280,583 A | * | 10/1966 | Jones et al. | 62/285 |
| 3,678,698 A | * | 7/1972 | Gelbard et al. | 62/276 |
| 5,710,352 A | * | 1/1998 | Tung | 570/166 |
| 2004/0256594 A1 | * | 12/2004 | Singh et al. | 252/71 |
| 2007/0010592 A1 | * | 1/2007 | Bowman et al. | 521/131 |
| 2007/0100011 A1 | | 5/2007 | Creazzo et al. | |
| 2007/0108403 A1 | | 5/2007 | Sievert et al. | |
| 2010/0032610 A1 | | 2/2010 | Nappa et al. | |
| 2010/0112328 A1 | | 5/2010 | Van Horn et al. | |

FOREIGN PATENT DOCUMENTS

WO 2008121783 A1 10/2008

OTHER PUBLICATIONS

Hortin, Kenneth L., Appliance Research Consortium Project, "Refrigerator Food Liners vs. HCFC Foams," 42nd International Appliance Technical Conference, May 22, 1991.

* cited by examiner

*Primary Examiner* — Irina S Zemel
(74) *Attorney, Agent, or Firm* — Colleen D. Szuch

(57) ABSTRACT

A heat transfer system and method for controlling heat transfer to and from a container having thermal insulation disposed with respect to said container or compartment so as to inhibit the flow of heat into and/or out of the compartment, said insulation comprising a polymeric material having closed cells therein wherein said cells are formed from and/or contain a haloalkene according to Formula IA:

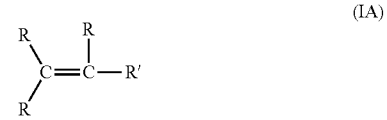

(IA)

where each R is independently Cl, F, H, or $CF_3$, provided that the total number of carbon atoms is either 3 or 4,
R' is $(CR_2)_nY$,
Y is $CF_3$
and n is 0 or 1;
and a heat transfer system for adding and/or removing heat from the compartment or container by use of a heat transfer fluid comprising a haloalkene Formula IB:

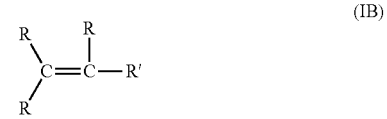

(IB)

where each R is independently Cl, F or H
R' is $(CR_2)_nY$,
Y is $CF_3$
and n is 0 or 1.

16 Claims, 3 Drawing Sheets

SYSTEMS FOR EFFICIENT HEATING AND/OR COOLING AND HAVING LOW CLIMATE CHANGE IMPACT

CROSS REFERENCE TO RELATED APPLICATIONS

This application claims the benefit of U.S. Provisional patent application Ser. No. 61/368,249 filed Jul. 27, 2010, the contents of which are incorporated herein by reference in its entirety.

This application is also a continuation-in-part of U.S. patent application Ser. No. 12/276,137, (now abandoned), filed Nov. 21, 2008, which claims priority to U.S. Provisional patent application No. 60/989,977 filed Nov. 25, 2007, and which also claims priority to as a continuation of PCT patent application number PCT/US07/64570 filed Mar. 21, 2007, and is a continuation-in-part of U.S. patent application Ser. No. 11/474,887 filed Jun. 26, 2006, now pending, which in turn claims priority to U.S. Provisional patent application Ser. No. 60/784,731 filed Mar. 21, 2006, each of which is incorporated herein by reference in their entirety.

This application is also a continuation-in-part of U.S. patent application Ser. No. 12/426,948, filed Apr. 20, 2009, now U.S. Pat. No. 8,033,120 issued Oct. 11, 2011, which claims the priority benefit as a continuation-in-part of U.S. patent application Ser. No. 10/694,273, filed Oct. 27, 2003, now U.S. Pat. No. 7,534,366, issued May 19, 2009 which are each incorporated herein by reference and which in turn claims the benefit of Provisional Application Nos. 60/421,263, and 60/421,435, each of which was filed on Oct. 25, 2002, and each of which is incorporated herein by reference.

FIELD OF THE INVENTION

This invention relates to heat transfer systems, appliances and units, including in domestic and small refrigerator/freezers and/or air conditioners and/or heat pumps, and in particular such systems which include a heat transfer fluid and insulation for reducing the loss or gain of heat to/from the system.

BACKGROUND OF THE INVENTION

Mechanical refrigeration systems, and related heat transfer devices such as heat pumps and air conditioners, using refrigerant liquids are well known in the art for industrial, commercial and domestic uses. In appliances and systems designed to contain items at a temperature either below or above the ambient temperature for an extended period of time, there are two important features that contribute to both the energy efficiency of such systems and to the environmental impact of such systems. The first feature or aspect of such systems is the material used as the heat transfer fluid in such systems. The second feature is the blowing agent that is used to form and/or is contained in the thermal insulation material used to help minimize the unwanted transfer of heat to or from the compartment or region being heated.

SUMMARY OF THE INVENTION

In one aspect, the present invention relates to a heat transfer system for containing item(s) or fluid(s) at a temperature either below or above ambient temperature including (a) a container or compartment for holding an item(s) or fluid(s) to be maintained in a cooled or heated condition relative to the ambient temperature; (b) thermal insulation disposed with respect to said container or compartment so as to inhibit the flow of heat into and/or out of the compartment, said insulation comprising a polymeric material having closed cells therein wherein said cells are formed from and/or contain a haloalkene according to Formula IA:

(IA)

where each R is independently Cl, F, H, or $CF_3$, provided that the total number of carbon atoms is either 3 or 4,
R' is $(CR_2)_n Y$,
Y is $CF_3$
and n is 0 or 1;

and (c) a heat transfer system for adding and/or removing heat from the compartment or container by use of a heat transfer fluid comprising a haloalkene Formula IB:

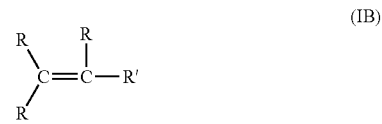

(IB)

where each R is independently Cl, F or H
R' is $(CR_2)_n Y$,
Y is $CF_3$
and n is 0 or 1.

While not limited thereto, the container or compartment for holding an item(s) or fluid(s) of the present invention include refrigerators, freezers, vending machines, reach-in coolers, transport refrigeration units, and water heater heat pumps.

In certain embodiments, the haloalkene according to Formula IA is selected from the group consisting of 1,1,1,4,4,4-hexafluoro-2-butene (1336), 1-chloro-3,3,3-trifluoropropene (1233zd), 1,3,3,3-tetrafluoropropene (1234ze), and combinations thereof. In further aspects, 1,1,1,4,4,4-hexafluoro-2-butene (1336) is provided as the cis isomer; 1-chloro-3,3,3-trifluoropropene (1233zd) is provided as the trans isomer; and/or 1,3,3,3-tetrafluoropropene (1234ze) is provided as the trans isomer.

In further embodiments, the haloalkene according to Formula IB is selected from the group consisting of 1-chloro-3,3,3-trifluoropropene (1233zd), 1,3,3,3-tetrafluoropropene (1234ze), 2,3,3,3-tetrafluoropropene (1234yf) and combinations thereof. In such embodiments, 1-chloro-3,3,3-trifluoropropene (1233zd) is provided as the trans isomer and/or 1,3,3,3-tetrafluoropropene (1234ze) is provided as the trans isomer.

In certain embodiments of the present invention, the haloalkene according to Formula IA is 1,1,1,4,4,4-hexafluoro-2-butene (1336) and/or 1-chloro-3,3,3-trifluoropropene (1233zd) and the haloalkene according to Formula IB is 1,3,3,3-tetrafluoropropene (1234ze) and/or 2,3,3,3-tetrafluoropropene (1234yf). In certain alternative embodiments, the haloalkene according to Formula IA is 1,1,1,4,4,4-hexafluoro-2-butene (1336) and the haloalkene according to Formula IB is 1-chloro-3,3,3-trifluoropropene (1233zd), 1,3,3,3-tetrafluoropropene (1234ze) and/or 2,3,3,3-tetrafluoropropene (1234yf).

The present invention also relates to a method for transferring or removing heat from a container or compartment holding an item(s) or fluid(s) comprising:

providing thermal insulation within said container or compartment so as to inhibit the flow of heat into and/or out of the compartment, said thermal insulation comprising a polymeric material having closed cells therein wherein said cells are formed from and/or contain a haloalkene according to Formula IA:

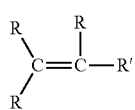

(IA)

where each R is independently Cl, F, H, or $CF_3$, provided that the total number of carbon atoms is either 3 or 4,
R' is $(CR_2)_n Y$,
Y is $CF_3$
and n is 0 or 1; and
adding and/or removing heat from the compartment or container by use of a heat transfer fluid comprising a haloalkene Formula IB:

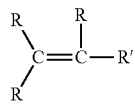

(IB)

where each R is independently Cl, F or H
R' is $(CR_2)_n Y$,
Y is $CF_3$
and n is 0 or 1.

Additional embodiments and advantages to the invention will be readily apparent is to one of skill in the art based on the disclosure provided herein.

BRIEF DESCRIPTION OF THE FIGURES

FIG. 3 provides a graphic illustration comparing the boiling point and pressure-temperature curve for 1234yf, 134a and R-600a.

DETAILED DESCRIPTION OF THE INVENTION

Figure 1:
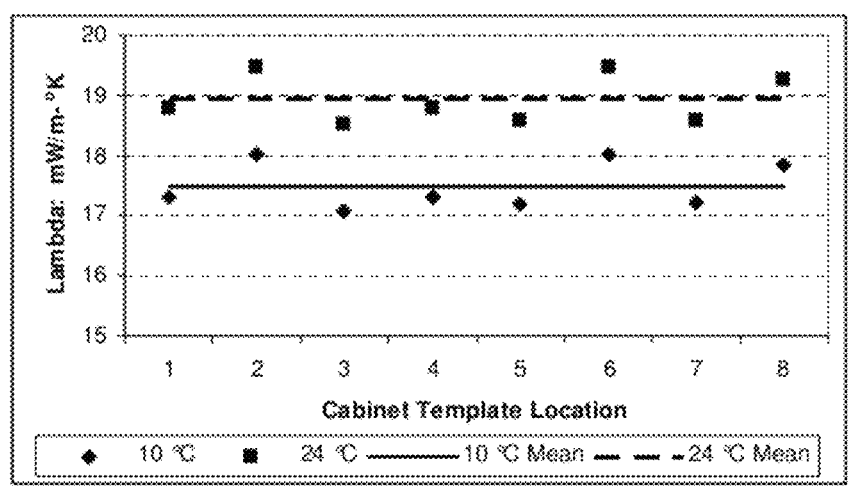
FIG. 1 provides a graphic illustration of the lambda (k-factor) performance in eight different locations of the refrigerator/freezer.

Applicants have come to appreciate that the judicious selection of the materials to be used for the heat transfer fluid and as the blowing agent in container-type heat transfer systems, particularly in relatively small systems such as domestic refrigerators and freezers, vending machines, reach-in coolers, transport refrigeration units, water heater heat pumps and the like, can provide such systems with highly advantageous energy performance while at the same time providing such systems that have extraordinarily low environmental impact.

One aspect of the present invention provides systems, devices and methods for containing item(s) or fluid(s) at a temperature either below or above the ambient temperature, preferably for an extended period of time (such as at least several hours or days). Such systems, devices, and methods include (a) a container or compartment for holding an item(s) or fluid(s) to be maintained in a cooled or heated condition relative to the ambient; (b) thermal insulation disposed with respect to said container or compartment so as to inhibit the flow of heat into and/or out of the compartment, said insulation comprising a polymeric material having closed cells therein wherein said cells are formed from and/or contain a haloalkene according to Formula IA:

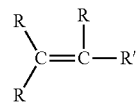

(IA)

where each R is independently Cl, F, H, or $CF_3$, provided that the total number of carbon atoms is either 3 or 4,
R' is $(CR_2)_n Y$,
Y is $CF_3$
and n is 0 or 1;
and (c) a heat transfer system for adding and/or removing heat from the compartment or container by use of a heat transfer fluid comprising a haloalkene Formula IB:

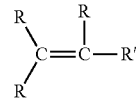

(IB)

where each R is independently Cl, F or H
R' is $(CR_2)_n Y$,
Y is $CF_3$
and n is 0 or 1.

As used herein the terms container and compartment are used in the broad sense and are not limited to containers that fully enclose or surround the items or fluid being contained. Thus, for example, containers that have relatively permanent openings, such as would be the case in reach-in coolers and refrigerators, are encompassed within the meaning of this term.

In certain preferred embodiments the compound of Formula IA comprises, and preferably comprises at least about 50% by weight, and more preferably comprises at least about 70% by weight, and even more preferably consists essentially of one or more compounds selected from 1,1,1,4,4,4-hexafluoro-2-butene (1336), 1-chloro-3,3,3-trifluoropropene (1233zd), and 1,3,3,3-tetrafluoropropene (1234ze). In certain highly preferred aspects of such embodiments, the 1-chloro-3,3,3-trifluoropropene (1233zd) is trans1-chloro-3,3,3-trifluoropropene (1233zd(E)), the 1,3,3,3-tetrafluoropropene (1234ze) is trans-1,3,3,3-tetrafluoropropene (1234ze(E)), and the 1,1,1,4,4,4-hexafluoro-2-butene (1336) is cis-1,1,1,4,4,4-hexafluoro-2-butene (1336(Z)).

In certain preferred embodiments, including particularly and preferably the embodiments in which the compound of Formula 1A comprises, and preferably comprises at least about 50% by weight, and more preferably comprises at least about 70% by weight, and even more preferably consists essentially of one or more compounds selected from 1,1,1,4,4,4-hexafluoro-2-butene (1336), 1-chloro-3,3,3-trifluoropropene (1233zd), and 1,3,3,3-tetrafluoropropene (1234ze), and the compound of Formula IB comprises, and preferably comprises at least about 50% by weight, and more preferably comprises at least about 70% by weight, and even more preferably consists essentially of one or more compounds selected from 1-chloro-3,3,3-trifluoropropene (1233zd) (preferably trans-1233zd), 2,3,3,3-tetrafluoropropene (1234yf) and 1,3,3,3-tetrafluoropropene (1234ze) (preferably trans-1234ze). In certain of such embodiments, the 1-chloro-3,3,3-trifluoropropene (1233zd) is trans1-chloro-3,3,3-trifluoropropene (1233zd(E)), the 1,3,3,3-tetrafluoropropene (1234ze) is trans-1,3,3,3-tetrafluoropropene (1234ze(E)), and the 1,1,1,4,4,4-hexafluoro-2-butene (1336) is cis1,1,1,4,4,4-hexafluoro-2-butene (1336(Z)).

In certain preferred embodiments, the compound of Formula 1A comprises, and preferably comprises at least about 50% by weight, and more preferably comprises at least about 70% by weight, and even more preferably consists essentially of one or more compounds selected from 1,1,1,4,4,4-hexafluoro-2-butene (1336), and 1-chloro-3,3,3-trifluoropropene (1233zd), and the compound of Formula IB comprises, and preferably comprises at least about 50% by weight, and more preferably comprises at least about 70% by weight, and even more preferably consists essentially of one or more compounds selected from 2,3,3,3-tetrafluoropropene (1234yf) and 1,3,3,3-tetrafluoropropene (1234ze) (preferably trans-1234ze).

In certain preferred embodiments, the compound of Formula 1A comprises, and preferably comprises at least about 50% by weight, and more preferably comprises at least about 70% by weight, and even more preferably consists essentially of one or more compounds selected from 1,1,1,4,4,4-hexafluoro-2-butene (1336) and 1-chloro-3,3,3-trifluoropropene (1233zd), and the compound of Formula IB comprises, and preferably comprises at least about 50% by weight, and more preferably comprises at least about 70% by weight, and even more preferably consists essentially of 1,3,3,3-tetrafluoropropene (1234ze), and even more preferably trans-1234ze.

In certain preferred embodiments, the compound of Formula 1A comprises, and preferably comprises at least about 50% by weight, and more preferably comprises at least about 70% by weight, and even more preferably consists essentially of 1,1,1,4,4,4-hexafluoro-2-butene (1336) (preferably cis-1336) and the compound of Formula IB comprises, and preferably comprises at least about 50% by weight, and more preferably comprises at least about 70% by weight, and even more preferably consists essentially of 1,3,3,3-tetrafluoropropene (1234ze), and even more preferably trans-1234ze.

In certain preferred embodiments, the compound of Formula 1A comprises, and preferably comprises at least about 50% by weight, and more preferably comprises at least about 70% by weight, and even more preferably consists essentially of one or more compounds selected from 1,1,1,4,4,4-hexafluoro-2-butene (1336) (preferably cis-1336) and the compound of Formula IB comprises, and preferably comprises at least about 50% by weight, and more preferably comprises at least about 70% by weight, and even more preferably consists essentially of and 1-chloro-3,3,3-trifluoropropene (1233zd) (preferably trans-1233zd).

In certain preferred embodiments, the compound of Formula 1A comprises, and preferably comprises at least about 50% by weight, and more preferably comprises at least about 70% by weight, and even more preferably consists essentially of one or more compounds selected from 1-chloro-3,3,3-trifluoropropene (1233zd) (preferably trans-1233zd) and the compound of Formula IB comprises, and preferably comprises at least about 50% by weight, and more preferably comprises at least about 70% by weight, and even more preferably consists essentially of and 1,3,3,3-tetrafluoropropene (1234ze), and even more preferably trans-1234ze.

In certain preferred embodiments, the compound of Formula 1A comprises at least about 50% by weight, and more preferably comprises at least about 70% by weight, and even more preferably consists essentially of 1-chloro-3,3,3-trifluoropropene (1233zd) (preferably trans-1233zd), and the compound of Formula IB comprises, and preferably comprises at least about 50% by weight, and more preferably comprises at least about 70% by weight, and even more preferably consists essentially of 2,3,3,3-tetrafluoropropene (1234yf).

In certain preferred embodiments, the compound of Formula 1A comprises at is least about 50% by weight, and more preferably comprises at least about 70% by weight, and even more preferably consists essentially of 1,1,1,4,4,4-hexafluoro-2-butene (1336) (preferably cis-1336), and the compound of Formula IB comprises, and preferably comprises at least about 50% by weight, and more preferably comprises at least about 70% by weight, and even more preferably consists essentially of 2,3,3,3-tetrafluoropropene (1234yf).

The present invention thus provides advantageous devices and systems, including household refrigerators and refrigerator/freezers. The preferred systems utilize: 1) refrigerant gas, as the working fluid in the refrigerant circuit; and 2) blowing agent, as the insulation gas in the thermally insulating foam, including particularly polyurethane foam insulation.

134a (1,1,1,2-tetrafluoroethane) refrigerant gas has heretofore been widely favored due to the high flammability characteristics of the alternative gas R-600a (isobutane). 245fa (1,1,1,3,3-pentafluoropropane) blowing agent has gained wide acceptance due to the excellent thermal performance imparted to the polyurethane foam insulation, and the flammability characteristics of the alternative blowing agents (hydrocarbons). A major detriment to the heretofore iterated hydrofluorocarbon (HFC) materials is the concern of the global warming potential (GWP).

Applicants have come to appreciate that the present systems and devices, including household refrigerators and the like, have a number of attributes for refrigerants and blowing agents that can, if the right combination of materials can be identified, potentially produce excellent and unexpected advantage over previously used materials. These attributes include:

good environmental properties, with preferred materials exhibiting zero ozone depletion potential (ODP), and low global warming potential (GWP);

low order of toxicity;

high performance, specifically with respect to efficiency and capacity for refrigerant gases;

thermal performance for blowing agents;

non-flammable, or low flammability risk characteristics; and relatively low cost.

Applicants have engaged in a research program that has identified a combination of refrigerant/blowing agent that provides surprising and unexpected advantage in the systems and devices described herein. The present provide exceptional environmental properties, including low global warming potential (GWP), low ODP and low or no VOC, with respect to climate change, while maintaining desirable properties and high performance characteristics. Meeting the requirements outlined in the EU F-gas regulation (for those applications specifically listed/regulated) requires GWP less than 150. Further, with respect to blowing agents in the context of end of lifetime management, embedded in the Waste Electronic and Electrical Equipment (WEEE) directive (2002/96/EC) is the concept of a GWP less than 15.

As discussed earlier, in the manufacture of household refrigerators/freezers in North America, 245fa blowing agent and 134a refrigerant gas have been favored due to the high performance attributes of these materials for this application. Illustrated in Table 1, certain preferred systems utilize 1233zd (which is sometimes also referred to herein as "1233ZD") as a blowing agent which exhibits physical properties similar to 245fa and 1234yf refrigerant which exhibits very similar properties to 134a as a refrigerant. It would be noted that the global warming potential (GWP) of both 1233ZD and 1234yf is more than two orders of magnitude lower than that of currently utilized HFCs, both are more than one order of magnitude lower than the present language in the EU F-Gas Regulation, and within the rationale of the EU WEEE Directive pertaining to household refrigerator/freezers, with a GWP less than 15.

TABLE 1

Low GWP materials Comparative Physical Properties

| Property | PUR Blowing Agents | | Refrigerant Gases | |
|---|---|---|---|---|
| | 1233ZD | 245fa | 1234yf | 134a |
| Molecular Weight | <134 | 134 | 114 | 102 |
| Boiling Point (° C.) | 15 < TBP < 30 | 15.3 | −30° C. | −26° C. |
| LFL/UFL (vol %-air) | None | None | 6.2-12.3 | None |
| GWP (100 yr) | 7 | 1030* | 4 | 1430* |

*2007 Technical Summary. Climate Change 2007: The Physical Science Basis. Contribution of Working Group 1 to the Fourth Assessment Report of the Intergovernmental Panel on Climate Change.

Preferred forms of the present invention utilize the preferred blowing agents in the various polyurethane (PUR) applications, including appliance foams. PUR foam properties of lambda (k-factor), compressive strength, and dimensional stability derived from characterization of hand mix foams or foam panels prepared by means of a high pressure foam machine have evidenced efficacy of the present systems in comparison to systems using 245fa foams. Furthermore, applicants have come to appreciate that until a commercial refrigerator product has been manufactured under industrial conditions, and assessed for energy performance and ancillary performance in other aspects, for example, liner compatibility, adhesion to liner and metal cabinet and doors, freeze stability, and other quality aspects, the full value and performance of the system will not be fully understood.

The following non-limiting examples serve to illustrate the invention.

EXAMPLES

Example 1

Low GWP Refrigerant Assessment: 1233zd

A scale trial, utilizing 1233zd blowing agent, in a commercially available polyurethane system, in a commercially available 710 liter (25 ft$^3$) household refrigerator freezer was undertaken. These thirty two refrigerator cabinets, with associated door sets, were foamed to investigate:

Lambda (k-factor) performance in various locations of the refrigerator;
Liner compatibility: High Impact Polystyrene (HIPS);
Dimensional stability;
Freeze stability at target density;
Compressive strength;
Adhesion (plastic liner material and metal case);
Foam closed cell content;
DOE (Department of Energy) Energy Performance;
Energy consumption with 134a refrigerant working fluid; and
Energy consumption with 1234yf refrigerant working fluid.

The baseline comparison for these low climate change impact refrigerators is the same commercial household refrigerator/freezer product utilizing 245fa blowing agent and 134a refrigerant. It should be noted that:

(1) polyurethane formulation: 1233ZD was equal molar substituted for 245fa. (2) No other modifications were made to the PUR system. (3) 134a sealed side loop: No modifications were made. (4) 1234yf sealed loop: minor modifications were made to the capillary tube diameter and length.

A. Polyurethane Foam Formulation

The polyurethane formulation was a commercially available, and currently utilized, 245fa appliance formulation, supplied by a major PUR systems house, with 1233ZD equal molar substituted for 245fa. The foaming process conditions, including machine temperatures and pressure were identical to the conditions for the 245fa baseline cabinets and doors. The polyurethane formulation and process parameters are illustrated in Table 2. Those familiar with refrigerator factories and scale will observe the scale of foam through put is consistent to scale found in North American world-scale factories, and is consistent with the size refrigerators manufactured in this test.

1233ZD processed very similarly to 245fa, and no modifications were made to the PUR foaming equipment or process, effectively, conventional existing PUR equipment, existing in the factory, accommodated 1233ZD.

Additionally, characterization of the 1233ZD versus 245fa foamed cabinets and doors suggest no differences:

Minimum fill weights were nearly identical—within one quarter of one percent (0.25%)

Over pack conditions (lambda/k-factor assessment) were identical at 10%

Density (10% over pack)
Cabinets: 34.9 kg/m$^3$ (2.18 lbs/ft$^3$)
Doors: 34.1 kg/m$^3$ (2.13 lbs/ft$^3$)

TABLE 2

Appliance PUR Formulation and Process Parameters

| Component | 245fa (% wt) | 1233ZD (% wt.) |
|---|---|---|
| Polyol Blend | 71.3 | → |
| Additives | 4.3 | → |
| Water | 1.0 | → |
| Blowing Agent | 23.4 | Equal Molar |
| Isocyanate | 100 | → |
| Door Foam Rate: kg/min (lbs/min) | 40.8 (90) | 40.8 (90) |
| Cabinet Foam Rate: kg/min (lbs/min) | 90.7 (200) | 90.7 (200) |
| B-Side Temperature ° C. (° F.) | 18.3 (65) | 18.3 (65) |
| A-Side Temperature ° C. (° F.) | 23.9 (75) | 23.9 (75) |
| Gel Time (sec) | 25.0 | 24.0 |
| Tack Free (sec) | 33.0 | 31.0 |
| Injection Pressure MPa (psi) | 10.4 (1500) | 10.4 (1500) |

B. Lambda (k-Factor) Performance

Foam samples from various locations in the fresh food compartment and freezer compartment were assessed for lambda (k-factor) performance. PUR foam thermal conductivity can, and will vary throughout the refrigerator/freezer due to foam flow characteristics and associated density variation. FIG. 1 illustrates the lambda (k-factor) performance in eight different locations of the refrigerator/freezer. It would be noted that the variation is not significant, and that the mean (average) lambda (k-factor) is: 17.5 mW/m-° K at 10° C. [0.121 BTU-in/ft²-° F. (50° F.)] and 18.9 mW/m-° K) at 24° C. [0.131 BTU-in/ft²-° F. (75° F.)]. In conjunction with PUR thermal conductivity performance, consideration of the closed cell content of foams is useful in understanding thermal conductivity variation, and that open cell content is not sufficient to cause compressive strength or dimensional stability issues in the longer term. The closed cell content analysis is shown in Table 3, and is in excess of 90% closed cells.

TABLE 3

Refrigerator PUR Foam Open Cell/Closed Cell Content ASTM D-6226

| Cabinet Location | % Open Cell | % Closed Cell |
|---|---|---|
| Top | 5.9 | 91.7 |
| Fresh Food # 1 | 5.6 | 92.0 |
| Fresh Food # 2 | 6.5 | 91.1 |
| Fresh Food # 3 | 6.2 | 91.2 |
| Fresh Food # 4 | 6.4 | 91.1 |
| Fresh Food # 5 | 6.8 | 90.7 |
| Freezer # 1 | 5.3 | 92.3 |
| Freezer # 2 | 9.9 | 87.8 |
| Freezer # 3 | 9.6 | 88.1 |
| Freezer # 4 | 10.9 | 86.8 |
| Mullion | 4.8 | 92.6 |
| Mean | 7.1 | 90.5 |

1) PUR Foam Density: 34.9 kg/m³ (10% over pack)
2) Typical Acceptable Open Cell Content: 10%
3) Polymer % content is the remainder to 100% (Polymer Mean % Content = 2.4%)

C. Compressive Strength Performance

Polyurethane foam in refrigerator freezers provides, firstly insulation performance, however, also provide structural strength for the appliance. Appliance PUR foams typically exhibit compressive strength greater than 100 kPa (15 psi) at 10% deflection. Samples were taken from varying locations in the fresh food and freezer compartments to assess compressive strength, and are shown in Table 4.

TABLE 4

Refrigerator PUR Foam Compressive Strength ASTM D-1621

| Cabinet Location | Parallel (kPa/psi) | Perpendicular (kPa/psi) |
|---|---|---|
| Fresh Food #1 | 118.3/17.15 | 113.5/16.45 |
| Fresh Food #2 | 124.5/18.05 | 123.2/17.85 |
| Freezer #1 | 138.7/20.10 | 117.6/17.05 |
| Freezer #2 | 180.4/26.15 | 161.5/23.40 |
| Mean | 140.5/20.36 | 129.0/18.69 |

1) Compressive strength: @ 10% deflection
2) PUR Foam Density: 34.9 kg/m³/2.18 lbs/ft³ (10% over pack)
3) Typical acceptable value: >103.5 kPa/15 psi D. Dimensional Stability Performance Dimensional stability of the PUR foam is important as a quality measure. Changes in foam dimensions (volume) when subjected to temperature variation impacts the external metal case, the internal liner, and should the volume change due to temperature difference be extreme, impacts the adhesion characteristics to the metal case and liner. Refrigerator/freezer appliances, particularly in the freezer section, are subjected to wide temperature difference between the compartment interior and ambient room temperature in the home. PUR foam samples from various locations in the fresh food and freezer compartments were assessed for volume change at temperature extremes over 1 day and 7 day interval, and exhibited less than 1% average volume change, and the results are shown in Table 5.

TABLE 5

Cabinet PUR Foam Dimensional Stability ASTM D-2126

| | Dimensional Stability (% Volume Change) | | | |
|---|---|---|---|---|
| Cabinet Location | 1 day (−30° C.) | 1 day (70° C.) | 7 day (−30° C.) | 7 day (70° C.) |
| Fresh Food #1 | +0.70 | −0.55 | +0.25 | −0.35 |
| Fresh Food #2 | +0.10 | −0.30 | −0.55 | −0.60 |
| Freezer #1 | +0.05 | −0.90 | −0.55 | +0.05 |
| Freezer #2 | −2.40 | −0.75 | −1.40 | +0.00 |
| Mean | −0.39 | −0.63 | −0.56 | −0.23 |

1) PUR Foam Density: 34.9 kg/m³ (10% over pack)
2) Typical Allowable Foam Volume Change: 3.0%

E. Plastic Liner (HIPS) Compatibility

Plastic liners, either high impact polystyrene (HIPS) or acrylonitrile butadiene styrene (ABS) are currently utilized in household refrigerators/freezers, though, steel liners are used in some specific refrigerator designs and freezers. Differing liner materials (excepting steel) exhibit varying compatibility to PUR foams. Liner compatibility is dependent upon a wide variety of variables: plastic thickness, extrusion of the plastic sheet conditions, thermoforming or vacuum forming conditions, amongst others, and not the least, the blowing agent. Chlorofluorocarbons (11), hydrochlorofluorocarbons (141b, 142b, and 22), and hydrofluorocarbons (245fa and 134a), as well as hydrocarbon blowing agents all exhibited quite varying compatibility with either HIPS or ABS liner material. Liner compatibility to PUR foams containing new blowing agents is a significant concern, as correcting liner compatibility, while not an insurmountable problem, can result in added cost to the OEM.

There is no confident method of a priori assessing refrigerator liner materials without building a refrigerator, subjecting the refrigerator to thermal cycling, and subsequently assessing the liner for blistering and cracking. High impact polystyrene (HIPS) liner material was utilized in this refrigerator trial.

Four refrigerator/freezers with doors were thermal cycled in a cold room chamber
Hot cycle: 54° C. (130° F.) for 10 hours
Cold cycle: −34° C. (−30° F.) for 10 hours
Five consecutive days Upon completion of the five days thermal cycling protocol, the HIPS liners did not exhibit, and were free of, blisters, cracks, or any visual degradation.

F. DOE Energy Assessment

The U.S. Department of Energy (DOE) established, in July 2001, a standard (DOE Standard) for the maximum energy consumption of household refrigerators. In simplified terms (reader is referred to Federal Register 10CFR 430 for more detail) the standard allows a maximum energy usage by refrigerator internal volume, adjusted for various accessories, such as though the door water and ice dispensers. In addition, the DOE provides for the Energy Star label for refrigerators, refrigerator/freezers, and freezers, which, as of March 2008 is DOE Standard minus 20% energy consumption. Further, presently the DOE is in the process of establishing, for promulgation in 2014, a is revised and presumably more stringent energy standard for household refrigerators, refrigerator/freezers, and freezers.

Figure 2:
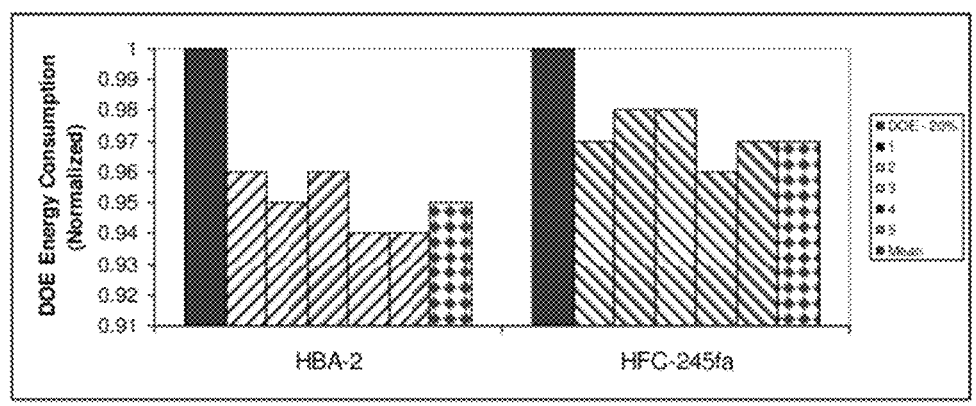
FIG. 2 provides a graphic illustration of the comparison of DOE Energy Efficiency Performance between HBA-2 (1233zd) and 245fa.

All the lambda (k-factor) assessments aside, meeting the DOE Energy Standard determines whether a refrigerator meets the energy requirements to be sold in the U.S. The refrigerator/freezers manufactured in this trial not only met the DOE Standard, not only met the DOE Energy Star label, but exceeded the Energy Star label requirements by an average of 7.6%, effectively DOE Standard minus 27.6%. Five refrigerator/freezers utilizing 1233ZD blowing agent/134a refrigerant were assessed by the DOE Energy Star test method. Five refrigerators/freezers utilizing 245fa blowing agent/134a refrigerant was the baseline comparison, that on average, exceeded DOE Energy Star label by 6.0%. Effectively, the 1233ZD refrigerator/freezers showed an energy reduction of 1.6% from the baseline, with the results (normalized) illustrated in FIG. 2.

G. Discussion—Household Refrigerator Energy Performance utilizing 1233ZD Blowing Agent Commercially manufactured 710 liter (25 ft$^3$) household refrigerator/freezers with 1233ZD, equal molar substituted for 245fa, in a commercially available 245fa appliance PUR formulation, exceeded the DOE Energy Star performance criteria, and, exceeded the 245fa baseline performance.

1233ZD, in all ancillary assessment related to a household refrigerator/freezer, met or exceeded all requirements, that is liner compatibility, compressive strength, dimensional stability, and freeze stability.

Example 2

Low GWP Refrigerant Assessment: 1234yf

Figure 3:
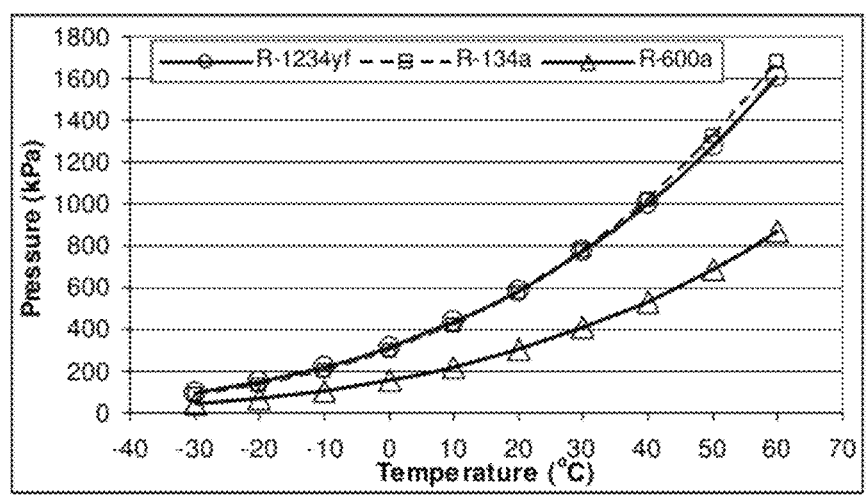

1234yf was the low GWP refrigerant gas chosen for this work due the very close proximity of boiling point and pressure-temperature curve—compared to 134a. This is shown on FIG. 3, wherein the pressure-temperature curve for 1234yf and 134a nearly coincide, whereas R-600a is a much lower pressure refrigerant gas.

Further to characterization of refrigerant working fluids suitability is thermal stability with compressor lubricants under extreme conditions of temperature and moisture (water) contamination. 1234yf and a typical appliance compressor oil—ISO 10 (Proeco 10S) were evaluated utilizing ASHRAE Standard 97 test method. Under extreme conditions of high moisture (1000 ppm); high temperatures (200° C.); and two week duration, visual examination of the sealed tubes (containing 1234yf/lubricant) exhibited no change in the appearance. Analysis of the oil yielded very low acidity values (TAN values ranging from 0.07 to 0.44); and, GC analysis and molecular weight analysis of the refrigerants indicated no change in the purity. Thus concluding that 1234yf is stable, used in conjunction with typical lubricants for these applications.

Simulations utilizing a semi-theoretical model: Cycle-11 UA (Domanski and McLinden 1992) confirmed 1234yf as a near drop-in replacement to 134a in this refrigerator/freezer application. Table 6 illustrates the simulation comparison of 1234yf to 134a.

on Buckinghan Pi dimensionless number. This model accounts for both thermodynamic and transport properties of the refrigerant.

Simulations were performed for design conditions of −23° C. evaporation temperature, 0° C. superheat at the evaporator outlet, and 32.2° C. compressor inlet temperature. The condensing temperature was 55° C. with 5° C. sub-cooling at the condenser outlet. Previous system simulations determined the 'target' mass flow, allowing 1234yf to equal 134a capacity. Table 7 illustrates simulations for the drop-in assessment, and for modified capillary tube diameter assessment, while maintaining the same characteristic overall length. The 134a baseline calculations are a capillary tube: is 0.66 mm diameter; 2.7 m length; of which 1.622 m is in contact with the suction line.

Five 1233ZD PUR foamed (710 liter/25 ft$^3$) refrigerator/freezers were built up for energy performance utilizing 1234yf replacement for 134a. Minor modifications to the capillary tube diameter and length were made prior to foaming the refrigerator/freezer with 1233ZD PUR foam. These low GWP refrigerators are in assessment at this writing.

TABLE 7

Capillary tube/Suction Line Heat Exchanger

| Refrigerant | From Evap. (m) | Heat Exch (m) | To Comp (m) | Diameter (mm) | Mass Flow (kg/hr) | (%) | Target (%) |
|---|---|---|---|---|---|---|---|
| R-134a | 0.898 | 1.622 | 0.180 | 0.66 | 4.335 | 100.0 | |
| 1234yf drop-in | 0.898 | 1.622 | 0.180 | 0.66 | 4.116 | 94.9 | |
| 1234yf modified | 0.898 | 1.622 | 0.180 | 0.71 | 4.978 | 114.8 | 130.0 |

1) General guidelines: charge optimization will allow equilibrium balance of capillary tube & refrigerant flow.

B. Discussion: Household Refrigerator Energy Performance Utilizing 1234yf

1234yf, as a potential 134a replacement, exhibits significant promise as equal in energy efficiency performance, low GWP refrigerant fluid, with minor (sic low manufacturing cost) modifications in a NA style household refrigerator/freezer. Further, 1234yf utilization significantly mitigates the risk associated with utilization of highly flammable hydrocarbon refrigerants, such as R-600a.

Example 3

Flammability

1233ZD is a non-flammable liquid by ASTM E-681 test methods, and exhibits no flashpoint or vapor flame limits. In

TABLE 6

Refrigerant Assessment in Household Refrigerators

| Refrig. | Displ. | Capacity | Eff. | Flow$_{Mass}$ | Pd/Pd | UA, ev. | UA, cd | $\Delta P_{Evap}$ | $\Delta P_{Cond}$ | $T_{Evap}$ | $T_{Cond}$ |
|---|---|---|---|---|---|---|---|---|---|---|---|
| 134a | 100 | 100 | 100 | 100 | 100 | 100 | 100 | 100 | 100 | 100 | 100 |
| 1234yf | 100 | 107 | 102 | 130 | 87 | 104 | 119 | 119 | 136 | 100 | 99 |

HFO-1 1) 1234yf 'drop-in' example
HFC-1 2) 134a baseline = 100%

A. Expansion Devices

Mass flow differences shown in Table 6, suggest modifications in capillary tubes. An analysis of capillary tubes was performed utilizing ASHRAE RP 948 model, which is based transportation, storage, and in factory use as a blowing agent, 1233ZD has no limitations on hazards classification.

1234yf is a flammable gas. However, the flammability characterization, and associated risk in use, of 1234yf is significantly different from highly flammable is hydrocarbon refrigerants, for example R-600a (isobutane). The significance centers in: the minimum ignition energy (very high for 1234yf/very low for R-600a); the heat of combustion (low for 1234yf/high for R-600a); and burning velocity, or flame speed (very slow for 1234yf/very high for R-600a). ASHRAE characterization of flammability: 134a=A1; R-600a=A3; while 1234yf=A2L (A2 category of flammability, however, very low in that category). The significant differences in flammability measures between 1234yf and R-600a are shown in Table 9.

TABLE 9

Flammability Characterization: 1234yf v. R-600a (isobutane)

| | LFL (vol %-air) (at 23° C.) | UFL (vol %-air) (at 23° C.) | Minimum Ignition Energy (mJoules) | Heat of Combustion (kJ/kg) | Burning Velocity (cm/sec) |
|---|---|---|---|---|---|
| 1234yf | 6.2 | 12.3 | >5000/<10000 | 10,730 | 1.5 |
| R-600a | 1.8 | 8.4 | 0.52 | 45,680 | 40.0 |

In preferred embodiments, the present invention a North American design platform refrigerator [eg., 710 liter (25 ft$^3$)], for a highly energy efficient household refrigerator/freezer utilizing ultra low global warming potential (GWP less than 15) materials, in the manner of blowing agent for the polyurethane foam insulation and refrigerant working fluid inclusive. Unlike hydrocarbon blowing agent and refrigerant gases, 1233ZD and 1234yf achieve comparable energy performance to existing HFC materials without significant design or hardware modifications.

The heat transfer and blowing agent compositions used in the present systems and methods may include other components for the purpose of enhancing or providing certain functionality to the composition, or in some cases to reduce the cost of the composition. For example, the present compositions may include co-refrigerants, lubricants, stabilizers, metal passivators, corrosion inhibitors, flammability suppressants, and other compounds and/or components, and the presence of all such compounds and components is within the broad scope of the invention.

In certain preferred embodiments, the refrigerant compositions according to the present invention, especially those used in vapor compression systems, include a lubricant, generally in amounts of from about 30 to about 50 percent by weight of the composition, and in some case potentially in amount greater than about 50 percent and other cases in amounts as low as about 5 percent. Furthermore, the present compositions may also include a compatibilizer, such as propane, for the purpose of aiding compatibility and/or solubility of the lubricant. Such compatibilizers, including propane, butanes and pentanes, are preferably present in amounts of from about 0.5 to about 5 percent by weight of the composition. Combinations of surfactants and solubilizing agents may also be added to the present compositions to aid oil solubility, as disclosed by U.S. Pat. No. 6,516,837, the disclosure of which is incorporated by reference. Commonly used refrigeration lubricants such as Polyol Esters (POEs) and Poly Alkylene Glycols (PAGs), PAG oils, silicone oil, mineral oil, alkyl benzenes (ABs) and poly(alpha-olefin) (PAO) that are used in refrigeration machinery with hydrofluorocarbon (HFC) refrigerants may be used with the refrigerant compositions of the present invention. Commercially available mineral oils include Witco LP 250 (registered trademark) from Witco, Zerol 300 (registered trademark) from Shrieve Chemical, Sunisco 3GS from Witco, and Calumet R015 from Calumet. Commercially available alkyl benzene lubricants include Zerol 150 (registered trademark). Commercially available esters include neopentyl glycol dipelargonate, which is available as Emery 2917 (registered trademark) and Hatcol 2370 (registered trademark). Other useful esters include phosphate esters, dibasic acid esters, and fluoroesters. In some cases, hydrocarbon based oils are have sufficient solubility with the refrigerant that is comprised of an iodocarbon, the combination of the iodocarbon and the hydrocarbon oil might more stable than other types of lubricant. Such combination may therefore be is advantageous. Preferred lubricants include polyalkylene glycols and esters. Polyalkylene glycols are highly preferred in certain embodiments because they are currently in use in particular applications such as mobile air-conditioning. Of course, different mixtures of different types of lubricants may be used.

What is claimed is:

1. A system for containing item(s) or fluid(s) at a temperature either below or above ambient temperature comprising: (a) a container or compartment for holding an item(s) or fluid(s) to be maintained in a cooled or heated condition relative to the ambient temperature and comprising a high impact polystyrene liner; (b) thermal insulation disposed with respect to said container or compartment so as to inhibit the flow of heat into and/or out of the compartment, said insulation comprising a polymeric material having closed cells therein wherein said cells are formed from and/or contain a blowing agent comprising haloalkene blowing agent, wherein said haloalkene blowing agent comprises at least about 50% by weight of trans1-chloro-3,3,3-trifluoropropene (trans1233zd); and (c) a heat transfer system for adding and/or removing heat from the compartment or container by use of a heat transfer fluid comprising a haloalkene Formula IB:

(IB)

where each R is independently Cl, F or H
R' is $(CR_2)_nY$,
Y is $CF_3$
and n is 0 or 1,
wherein the high impact polystyrene liner is compatible with the thermal insulation in that it is substantially free of any visual degradation after five days of thermal cycling with the thermal insulation.

2. The system of claim 1 wherein 1-chloro-3,3,3-trifluoropropene (1233zd) in said blowing agent consists essentially of the trans isomer.

3. The system of claim 1 wherein the haloalkene according to Formula IB is selected from the group consisting of 1-chloro-3,3,3-trifluoropropene (1233zd), 1,3,3,3-tetrafluoropropene (1234ze), 2,3,3,3-tetrafluoropropene (1234yf) and combinations thereof.

4. The system of claim 3 wherein 1-chloro-3,3,3-trifluoropropene (1233zd) consists essentially of the trans isomer.

5. The system of claim 3 wherein 1,3,3,3-tetrafluoropropene (1234ze) consists essentially of the trans isomer.

6. The system of claim 1 wherein the haloalkene according to Formula IB is 1,3,3,3-tetrafluoropropene (1234ze) or 2,3,3,3-tetrafluoropropene (1234yf).

7. The system of claim 1 wherein the container or compartment for holding an item(s) or fluid(s) is selected from the group consisting of refrigerators, freezers, vending machines, reach-in coolers, transport refrigeration units, and water heater heat pumps.

8. A method for transferring or removing heat from a container or compartment holding an item(s) or fluid(s) comprising:

providing a high impact polystyrene liner and thermal insulation within said container or compartment so as to inhibit the flow of heat into and/or out of the compartment, said thermal insulation comprising a polymeric material having closed cells therein wherein said cells are formed from and/or contain a blowing agent and comprising haloalkene blowing agent wherein said haloalkene blowing agent comprises at least about 50% by weight of trans1-chloro-3,3,3-trifluoropropene (trans1233 zd); and adding and/or removing heat from the compartment or container by use of a heat transfer fluid comprising a haloalkene Formula IB:

(IB)

where each R is independently Cl, F or H
R' is $(CR_2)_n Y$,
Y is $CF_3$
and n is 0 or 1, wherein the high impact polystyrene liner is compatible with the thermal insulation in that it is substantially free of any visual degradation after five days of thermal cycling with the thermal insulation.

9. The method of claim 8 wherein 1-chloro-3,3,3-trifluoropropene (1233zd) in said blowing agent consists essentially of the trans isomer.

10. The method of claim 8 wherein the haloalkene according to Formula IB is selected from the group consisting of 1-chloro-3,3,3-trifluoropropene (1233zd), 1,3,3,3-tetrafluoropropene (1234ze), 2,3,3,3-tetrafluoropropene (1234yf) and combinations thereof.

11. The method of claim 8 wherein 1-chloro-3,3,3-trifluoropropene (1233zd) consists essentially of the trans isomer.

12. The method of claim 10 wherein 1,3,3,3-tetrafluoropropene (1234ze) consists essentially of the trans isomer.

13. The method of claim 8 wherein the haloalkene according to Formula IB is 1,3,3,3-tetrafluoropropene (1234ze) or 2,3,3,3-tetrafluoropropene (1234yf).

14. The method of claim 8 wherein the container or compartment for holding an item(s) or fluid(s) is selected from the group consisting of refrigerators, freezers, vending machines, reach-in coolers, transport refrigeration units, and water heater heat pumps.

15. The system of claim 1, wherein at least about 70% by weight of said blowing agent comprises trans1-chloro-3,3,3-trifluoropropene (trans1233zd).

16. The method of claim 8, wherein at least about 70% by weight of said blowing agent comprises trans1-chloro-3,3,3-trifluoropropene (trans1233zd).

* * * * *